US012776659B2

(12) United States Patent
Sheng et al.

(10) Patent No.: US 12,776,659 B2
(45) Date of Patent: Oct. 27, 2026

(54) ENERGY STORAGE CABINET AND ENERGY STORAGE SYSTEM

(71) Applicant: Huawei Digital Power Technologies Co., Ltd., Shenzhen (CN)

(72) Inventors: Ren Sheng, Dongguan (CN); Fan Wu, Wuhan (CN); Baoguo Chen, Dongguan (CN); Rui Ge, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/971,290

(22) Filed: Dec. 6, 2024

(65) Prior Publication Data

US 2025/0105662 A1 Mar. 27, 2025

Related U.S. Application Data

(63) Continuation of application No. PCT/CN2024/079440, filed on Feb. 29, 2024.

(30) Foreign Application Priority Data

Mar. 21, 2023 (CN) ........................ 202310308879.5

(51) Int. Cl.
*H02J 9/06* (2006.01)
*H01M 10/42* (2006.01)
(Continued)

(52) U.S. Cl.
CPC ........... *H02J 9/068* (2020.01); *H01M 10/425* (2013.01); *H01M 50/204* (2021.01);
(Continued)

(58) Field of Classification Search
CPC ........ H02J 9/068; H02J 1/084; H02J 2101/24; H02J 3/381; H02J 7/35; H02J 9/061;
(Continued)

(56) References Cited

U.S. PATENT DOCUMENTS

2013/0113280 A1* 5/2013 Yang ......................... H02J 7/54 307/19
2015/0280462 A1* 10/2015 Ohtsuki .................... H02J 7/52 320/116

(Continued)

FOREIGN PATENT DOCUMENTS

CN 110518690 A 11/2019
CN 113629757 A 11/2021

(Continued)

*Primary Examiner* — Daniel Cavallari
(74) *Attorney, Agent, or Firm* — Maier & Maier, PLLC

(57) ABSTRACT

An energy storage cabinet includes a battery rack and a power conversion system. A switch unit is connected between a battery unit and the power conversion system. A first end of the power conversion system is connected to a bus. When an energy storage cabinet in the energy storage system is started, a voltage at the first end of the power conversion system is greater than a first preset voltage. The power conversion system in the to-be-started energy storage cabinet may obtain, through the first end, a voltage output by the started energy storage cabinet, convert the voltage into a target voltage, and then supply power to the start unit. After obtaining the power, the start unit controls the switch unit to be turned on. The battery unit may output stored electric energy through the power conversion system, to start the energy storage cabinet.

20 Claims, 14 Drawing Sheets

(51) Int. Cl.

| | |
|---|---|
| ***H01M 50/204*** | (2021.01) |
| ***H01M 50/251*** | (2021.01) |
| ***H01M 50/51*** | (2021.01) |
| ***H02J 1/08*** | (2006.01) |
| ***H02M 1/00*** | (2006.01) |

(52) U.S. Cl.
CPC ......... *H01M 50/251* (2021.01); *H01M 50/51* (2021.01); *H02J 1/084* (2020.01); *H02M 1/0067* (2021.05); *H01M 2220/10* (2013.01)

(58) Field of Classification Search
CPC .... H02J 9/062; H02J 3/32; H02J 3/001; H02J 15/00; H01M 10/425; H01M 50/204; H01M 50/251; H01M 50/51; H01M 2220/10; H02M 1/0067; Y02E 60/10
See application file for complete search history.

(56) References Cited

U.S. PATENT DOCUMENTS

| | | | | |
|---|---|---|---|---|
| 2017/0054134 | A1* | 2/2017 | Choi | G01R 19/16542 |
| 2017/0093187 | A1* | 3/2017 | Park | H02J 1/102 |
| 2019/0237980 | A1* | 8/2019 | Yang | G01R 31/36 |
| 2021/0050729 | A1* | 2/2021 | Arvind | H01M 10/425 |
| 2024/0204524 | A1* | 6/2024 | Drew | H02J 3/32 |
| 2024/0313275 | A1* | 9/2024 | Seo | H01M 10/441 |

FOREIGN PATENT DOCUMENTS

| | | | |
|---|---|---|---|
| CN | 217642739 | U | 10/2022 |
| CN | 115483695 | A | 12/2022 |
| CN | 115622207 | A | 1/2023 |
| CN | 116316761 | A | 6/2023 |

* cited by examiner

ENERGY STORAGE CABINET AND ENERGY STORAGE SYSTEM

CROSS-REFERENCE TO RELATED APPLICATIONS

This application is a continuation of International Application No. PCT/CN2024/079440, filed on Feb. 29, 2024, which claims priority to Chinese Patent Application 202310308879.5, filed on Mar. 21, 2023. The disclosures of the aforementioned applications are hereby incorporated by reference in their entireties.

TECHNICAL FIELD

Embodiments relate to the field of energy storage technologies, and to an energy storage cabinet and an energy storage system.

BACKGROUND

An energy storage system is a bidirectional energy interaction product and is used in scenarios such as a backup power supply, power smoothing on a power generation side, and peak cutting and valley filling on a user side. When a power failure occurs on an entire power grid or the energy storage system is installed for the first time, the system is in an off-grid mode and no alternating current is input. The energy storage system is a core of energy interaction. Therefore, in addition to complying with national standards, the energy storage system is also mandatorily required to have a black-start function. To be specific, in the off-grid mode, the energy storage system can be converted into a power supply with an independent power output, to supply power to important devices.

Currently, a common black-start manner is to dispose an uninterruptible power supply (UPS). The UPS is separately connected to a power grid and the energy storage system, and is configured to: before the power grid is powered off, store electric energy transmitted on the power grid; and when the power grid is powered off, provide the electric energy stored in the UPS to a control device in the energy storage system. After a power supply is restored, the control device controls the energy storage system to be started and re-output the stored electric energy to the power grid or a load, to implement a black start. The energy storage system includes a plurality of energy storage cabinets. In the foregoing black-start manner, the UPS needs to be connected to each energy storage cabinet through a cable. However, a cable connection between the UPS and the energy storage cabinet needs to be manually performed, and a cable connection error rate is high. As a result, the energy storage cabinet cannot be normally started.

SUMMARY

Embodiments provide an energy storage cabinet and an energy storage system to improve black-start reliability of the energy storage cabinet.

According to a first aspect, an embodiment provides an energy storage cabinet. The energy storage cabinet is used in an energy storage system. A single energy storage cabinet includes a battery rack and a power conversion system.

The battery rack includes a battery unit, a switch unit, and a start unit; the battery unit includes a plurality of energy storage batteries connected in series; the switch unit is connected between the battery unit and the power conversion system; a first end of the power conversion system is configured to be connected to a bus in an energy storage system to which the energy storage cabinet belongs; when a voltage at the first end of the power conversion system is greater than a first preset voltage, the power conversion system is configured to: convert the voltage at the first end of the power conversion system into a target voltage, and supply power to the start unit through a second end of the power conversion system; and the start unit is configured to: when the power supplied by the power conversion system is received, control the switch unit to be turned on, so that the battery unit is connected to the power conversion system.

When a power grid is powered off or the energy storage cabinet is installed for the first time, the energy storage cabinet needs to be started to form a connection to the power grid or a load. Because first ends of power conversion systems in a plurality of energy storage cabinets are configured to be connected to the bus, after another energy storage cabinet in the system is successfully started, electric energy exists on the bus, and the electric energy also exists at the first end of the power conversion system in the to-be-started energy storage cabinet. Therefore, the to-be-started energy storage cabinet may obtain the electric energy from the first end of the power conversion system, convert the obtained electric energy into the target voltage required for starting operating. After obtaining the electric energy, the start unit controls the switch unit to be turned on, to normally start the energy storage cabinet. In this way, black-start reliability of the energy storage cabinet is improved.

In a possible implementation, the start unit is further configured to: receive power supplied by the battery unit or an alternating current power supply, and control the switch unit to be turned on.

In an embodiment, an externally disposed uninterruptible power supply UPS may be used as an external alternating current power supply connected to the energy storage cabinet. If a cable connection between the energy storage cabinet and the UPS is correct and the UPS is normal, the start unit in the energy storage cabinet may obtain electric energy required for power supply from the UPS, and control the switch unit to be turned on, to start the energy storage cabinet. If the cable connection between the UPS and the energy storage cabinet is incorrect or the UPS is faulty, the start unit may alternatively obtain electric energy required for power supply from the battery unit in the energy storage cabinet, and control the switch unit to be turned on, to start the energy storage cabinet.

In a possible implementation, the start unit includes a first power supply circuit and a control circuit.

The first power supply circuit is connected between the second end of the power conversion system and the control circuit, and is configured to: when the power supplied by the power conversion system is received, supply the power to the control circuit; and the control circuit is connected to the switch unit, and is configured to: when the power supplied by the first power supply circuit is received, control the switch unit to be turned on.

In an embodiment, the first power supply circuit uses the power conversion system as a power supply. When the started energy storage cabinet exists in the energy storage system, the power conversion system in the to-be-started energy storage cabinet may obtain electric energy from the started energy storage cabinet through the first end, and supply power to the control circuit through the second end by using the obtained electric energy, to control the switch unit to be turned on, so as to normally start the energy storage cabinet and ensure start reliability of the energy storage cabinet.

In a possible implementation, the first power supply circuit includes a first auxiliary power supply. A first input end of the first auxiliary power supply is connected to a positive electrode of the second end of the power conversion system, a second input end of the first auxiliary power supply is connected to a negative electrode of the second end of the power conversion system, and an output end of the first auxiliary power supply is connected to the control circuit. The positive electrode of the second end of the power conversion system may be an interface for outputting a high level by the power conversion system, and the negative electrode of the second end of the power conversion system may be an interface for outputting a low level by the power conversion system.

In an embodiment, when the started energy storage cabinet exists in the energy storage system, the power conversion system in the to-be-started energy storage cabinet may obtain, through the first end, the electric energy output by the started energy storage cabinet, perform voltage regulation or other processing on the received electric energy, and then supply power to the first auxiliary power supply through the second end of the power conversion system. After obtaining the power, the first auxiliary power supply supplies the power to the control circuit, to control the switch unit to be turned on, so as to start the energy storage cabinet.

In a possible implementation, the first power supply circuit further includes: a first diode connected between the positive electrode of the second end of the power conversion system and the first input end of the first auxiliary power supply, and a second diode connected between the negative electrode of the second end of the power conversion system and the second input end of the first auxiliary power supply.

In an embodiment, the first diode and the second diode may be used to control a flow direction of a current in a process in which the power conversion system supplies the power to the start unit.

In a possible implementation, the first power supply circuit further includes a first switch and a second switch.

The first switch and the second switch are connected in parallel between the first input end of the first auxiliary power supply and a positive electrode of the battery unit; the second input end of the first auxiliary power supply is further connected to a negative electrode of the battery unit; when the first switch is turned on, the first power supply circuit receives the power supplied by the battery unit; and the second switch is configured to be turned on when the first switch is turned off, so that the first power supply circuit receives the power supplied by the battery unit.

In an embodiment, the first switch is turned on after receiving a drive signal, and the first switch is turned on to form an electric energy transmission path between the battery unit and the first auxiliary power supply. The battery unit may supply the power to the first auxiliary power supply. After obtaining the power, the first auxiliary power supply supplies power to the control circuit, so that the switch unit is turned on, to start the energy storage cabinet.

In a possible implementation, the first power supply circuit further includes: a third diode connected between the second switch and the positive electrode of the battery unit, and a fourth diode connected between the second input end of the first auxiliary power supply and the negative electrode of the battery unit.

In an embodiment, the third diode and the fourth diode may be used to control a flow direction of a current in a process in which the battery unit supplies the power to the first auxiliary power supply.

In a possible implementation, the start unit further includes a second power supply circuit. The second power supply circuit is connected to the control circuit and the alternating current power supply, and is configured to: receive the power supplied by the alternating current power supply, and supply the power to the control circuit. The control circuit is further configured to: when the power supplied by the second power supply circuit is received, control the switch unit to be turned on.

In an embodiment, the second power supply circuit uses the alternating current power supply as a power supply. When the external alternating current power supply is normal and the cable connection between the external alternating current power supply and the energy storage cabinet is correct, the external alternating current power supply may provide electric energy required for starting the start unit, to normally start the energy storage cabinet. In addition, because the first power supply circuit and the second power supply circuit operate independently, black-start reliability can be ensured.

In a possible implementation, the second power supply circuit includes a second auxiliary power supply, an input end of the second auxiliary power supply is configured to be connected to the alternating current power supply, and an output end of the second auxiliary power supply is connected to the control circuit.

In an embodiment, the second auxiliary power supply may obtain electric energy from the external alternating current power supply, and supply power to the control circuit. After obtaining the power, the control circuit may control the switch unit to be turned on, to implement black start of the energy storage cabinet.

In a possible implementation, the start unit is configured to: when an output voltage of the alternating current power supply is greater than a second preset voltage, receive the power supplied by the alternating current power supply.

In an embodiment, a minimum voltage required by the second auxiliary power supply for operating may be set to the second preset voltage. When the output voltage of the external alternating current power supply is greater than the second preset voltage, the voltage output by the external alternating current power supply may meet a requirement of the second auxiliary power supply for a power supply voltage.

In a possible implementation, the second power supply circuit further includes: a third switch connected between the alternating current power supply and a first input end of the second auxiliary power supply, and a fourth switch connected between the alternating current power supply and a second input end of the second auxiliary power supply. When the third switch and the fourth switch are turned on, the second power supply circuit receives the power supplied by the alternating current power supply.

In an embodiment, the third switch and the fourth switch are turned on after receiving a drive signal, and the third switch and the fourth switch form an electric energy transmission path between the alternating current power supply and the second auxiliary power supply. The second auxiliary power supply may obtain the electric energy from the external alternating current power supply, and supply the power to the control circuit. After obtaining the power, the control circuit controls the switch unit to be turned on, to implement black start of the energy storage cabinet.

In a possible implementation, the switch unit includes a fifth switch and a sixth switch.

The fifth switch is connected between the positive electrode of the battery unit and the positive electrode of the second end of the power conversion system, and the sixth switch is connected between the negative electrode of the battery unit and the negative electrode of the second end of the power conversion system.

In a possible implementation, the battery rack further includes an undervoltage protection circuit, and an action voltage of the undervoltage protection circuit may be set based on a quantity of energy storage batteries in the battery unit.

In an embodiment, with use of the energy storage cabinet or maintenance of the energy storage cabinet, the quantity of energy storage batteries in the battery unit may change. To implement safety protection of the energy storage cabinet, the undervoltage protection circuit may be disposed in the battery rack, and the action voltage of the undervoltage protection circuit may be set based on the quantity of energy storage batteries in the battery unit, to protect the energy storage cabinet.

According to a second aspect, an embodiment provides an energy storage system. The energy storage system includes a plurality of energy storage cabinets according to any possible implementation or design of the first aspect and a bus, and a first end of a power conversion system in each energy storage cabinet is connected to the bus.

In a possible implementation, a power conversion system in at least one energy storage cabinet is a DC/DC converter, the energy storage system further includes a DC/AC converter, and the DC/DC converter is connected to the DC/AC converter.

According to a third aspect, an embodiment provides a photovoltaic system. The photovoltaic system includes a plurality of photovoltaic modules, a DC/DC converter, a DC/AC converter, and the energy storage system according to any possible implementation or design of the second aspect.

The plurality of photovoltaic modules are connected to the DC/DC converter, and the plurality of photovoltaic modules are configured to convert light energy into a first direct current, and output the first direct current to the DC/DC converter. The DC/DC converter is connected to the DC/AC converter, and the DC/DC converter is configured to convert the first direct current into a second direct current, and output the second direct current to the DC/AC converter. The DC/AC converter is connected to the energy storage system, and is configured to convert the second direct current into an alternating current, and output the alternating current to a power-consuming device or the energy storage system. The energy storage system is configured to convert the alternating current into a third direct current and store the third direct current, or convert stored electric energy into the alternating current and output the alternating current to the power-consuming device.

According to a fourth aspect, an embodiment provides a power supply system. The power supply system includes: an alternating current power supply, at least one power-consuming device, and the energy storage system according to any possible implementation or design of the second aspect.

The alternating current power supply is connected to a part of or all energy storage cabinets in the energy storage system, and is configured to obtain electric energy from a power grid and supply power to the part of or all energy storage cabinets in the energy storage system. The energy storage system is connected to the at least one power-consuming device, and is configured to obtain electric energy from the power grid and store the electric energy, or use stored electric energy to supply power to the at least one power-consuming device.

For effects that can be achieved by any possible implementation or design of any one of the second aspect to the fourth aspect, refer to descriptions of effects that can be achieved by any possible implementation or design of the first aspect. Details are not described herein.

DETAILED DESCRIPTION OF EMBODIMENTS

Figure 1:
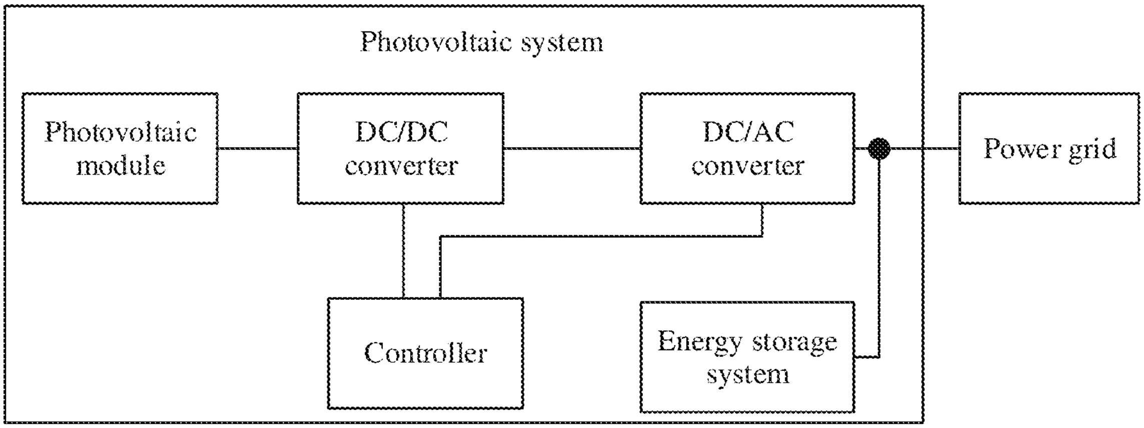
FIG. 1 is a diagram 1 of a structure of a photovoltaic system according to an embodiment.

The following describes in detail embodiments with reference to the accompanying drawings.

To make objectives, solutions, and advantages clearer, the following further describes the embodiments in detail with reference to the accompanying drawings. A specific operation method in a method embodiment may also be applied to an apparatus embodiment or a system embodiment. It should be noted that, in the descriptions of the embodiments, "a plurality" refers to two or more. In view of this, in embodiments, "a plurality of" may also be understood as "at least two". In addition, it should be understood that, in the descriptions of the embodiments, terms such as "first" and "second" are merely used for distinguishing and description, cannot be understood as an indication or implication of relative importance, and cannot be understood as an indication or implication of a sequence.

It should be noted that a "connection" in embodiments refers to an electrical connection, and a connection between two electrical elements may be a direct or indirect connection between the two electrical elements. For example, that A is connected to B may be that A is directly connected to B, or may be that A is indirectly connected to B through one or more other electrical elements. For example, that A is connected to B may alternatively be that A is directly connected to C, C is directly connected to B, A and B are connected through C.

It should be noted that a switch in embodiments may be one or more of a plurality of types of switch devices, such as a relay, a metal-oxide semiconductor field-effect transistor (MOSFET), a bipolar junction transistor (BJT), an insulated gate bipolar transistor (IGBT), or a silicon carbide (SiC) power transistor. The switch devices are not listed one by one in embodiments. Each switch device may include a first electrode (a first end), a second electrode (a second end), and a control electrode (a control end), and the control electrode is configured to control turning on or turning off of the switch. When the switch is turned on, a current may be transmitted between the first electrode and the second electrode of the switch. When the switch is turned off, a current cannot be transmitted between the first electrode and the second electrode of the switch. The MOSFET is used as an example. The control electrode of the switch is a gate. The first electrode of the switch may be a source of the switch, and the second electrode may be a drain of the switch. Alternatively, the first electrode may be a drain of the switch, and the second electrode may be a source of the switch.

The following clearly and completely describes the solutions in embodiments with reference to the accompanying drawings. The solutions provided in embodiments are applied to a large power supply device or a new energy system in which an energy storage cabinet is internally configured as a backup power supply. The new energy system includes, but is not limited to, a photovoltaic system, a wind power system, and a hydraulic system. The power supply device includes, but is not limited to, an industrial device, a smart factory device, and the like.

The following uses an example in which the new energy system is a photovoltaic system. FIG. 1 is a diagram of a structure of a photovoltaic system applicable to embodiments. As shown in FIG. 1, the photovoltaic system can include a plurality of photovoltaic modules, a direct current (DC) to direct current converter (a DC/DC converter), a direct current to alternating current (AC) converter (a DC/AC converter), and an energy storage system. The photovoltaic system may be connected to a power grid, and output generated electric energy to the power grid. Alternatively, the photovoltaic system may be directly connected to a load, and directly supply generated electric energy to the load.

The plurality of photovoltaic modules are connected to the DC/DC converter; and the plurality of photovoltaic modules may convert light energy into a first direct current, and output the first direct current to the DC/DC converter. The DC/DC converter is connected to the DC/AC converter, and the DC/DC converter may convert the received first direct current into a second direct current. The DC/AC converter is connected to the power grid or the load; and the DC/AC converter may convert the received direct current into an alternating current, and output the alternating current to the power grid or the load. The energy storage system is connected to the DC/AC converter; and the energy storage system may store redundant electric energy when electric energy output by the DC/AC converter exceeds an electric energy requirement of the power grid or the load, and output the stored electric energy to the power grid or the load when the electric energy output by the DC/AC converter is less than the electric energy requirement.

In actual application, the photovoltaic system shown in FIG. 1 may further include a controller. The controller is separately connected to the DC/DC converter and the DC/AC converter. The controller may be configured to: control the DC/DC converter to convert the first direct current into the second direct current, and control the DC/AC converter to convert the received direct current into the alternating current.

It should be understood that a connection relationship between the photovoltaic system and the power grid in FIG. 1 is a simplified example. In a specific implementation, another device may be further connected between the photovoltaic system and the power grid or the load. For example, a grid-tied transformer may be further connected between the photovoltaic system and the power grid, and the grid-tied transformer boosts the alternating current generated by the photovoltaic system to implement high-voltage transmission and the like. Such a conventional technology in the art is not limited.

In a possible implementation, a direct current energy storage battery is used in the energy storage system to store energy. A voltage of the direct current output by the DC/AC converter fluctuates greatly, and a voltage value of the output direct current cannot meet a voltage requirement of the energy storage system. Therefore, a power conversion system may be further configured in the energy storage system. The power conversion system may perform rectification and voltage regulation on the alternating current output by the DC/AC converter, to output a direct current voltage available to the energy storage battery in the energy storage system.

In actual application, when the connected power grid or load is powered off due to a fault, periodic maintenance, initial installation of the energy storage system, or the like, the energy storage system needs to be used as an independent power supply to supply power to the load or the power grid. In other words, a black start is performed.

Figure 2:
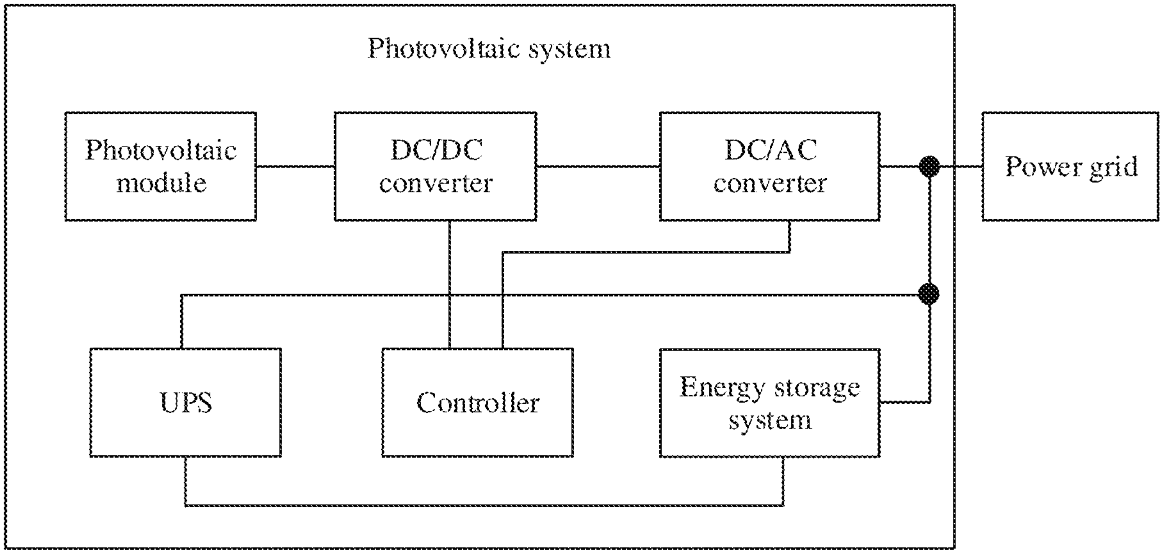
FIG. 2 is a diagram 2 of a structure of a photovoltaic system according to an embodiment.

Currently, a common black-start manner is to dispose an uninterruptible power supply (UPS) in the photovoltaic system. As shown in FIG. 2, the UPS may be connected to the power grid, and is configured to store electric energy transmitted on the power grid before the power grid is powered off, and provide the stored electric energy to the controller when the power grid or the load is powered off. After obtaining the power, the controller restores a connection between the photovoltaic system and the power grid or the load, control each device in the photovoltaic system to normally operate, and provide generated electric energy to the power grid or the load again, to implement a black start of an energy storage cabinet.

In actual application, a plurality of energy storage cabinets can be configured in the energy storage system, to implement high power supplying or output electric energy to the power grid or the load. In the black start manner, the UPS needs to be connected to each energy storage cabinet. A cable connection in this part can be performed manually, and a cable connection error rate is high. As a result, the energy storage system cannot be normally started.

In view of this, the embodiments provide an energy storage cabinet and an energy storage system. The energy storage cabinet may be used in the photovoltaic system shown in FIG. 1 or another large-scale power supply device, and is configured to: when a power grid is powered off or the energy storage cabinet is installed for the first time, implement a black start by using electric energy output by another energy storage cabinet in the energy storage system, to improve operating reliability of the energy storage system.

Figure 3:
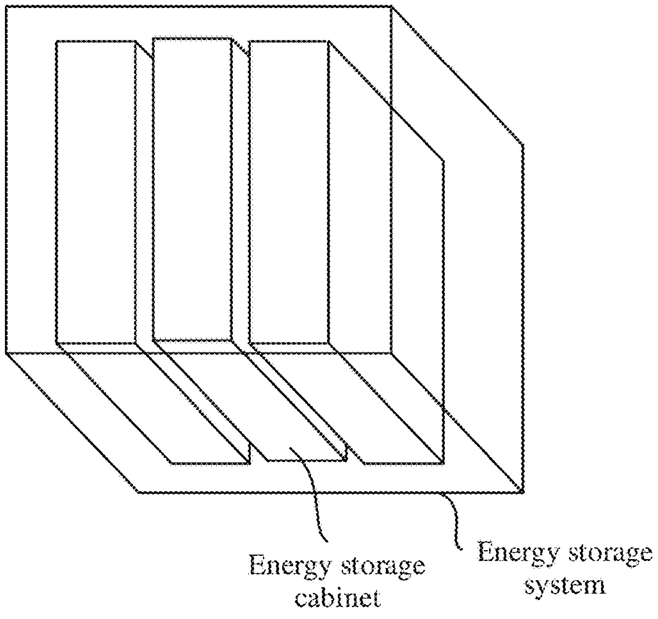
FIG. 3 is a diagram 1 of a structure of an energy storage system according to an embodiment.

As shown in FIG. 3, the energy storage cabinet provided in embodiments may be used in the energy storage system. The energy storage system may include a plurality of energy storage cabinets, each energy storage cabinet is provided with an electric energy output port, and electric energy output ports of the plurality of energy storage cabinets are connected to each other and connected to a power-consuming device, to supply power to the power-consuming device. The power-consuming device may be the power grid or a load.

The following describes a structure of the energy storage cabinet in detail with reference to embodiments.

Figure 4:
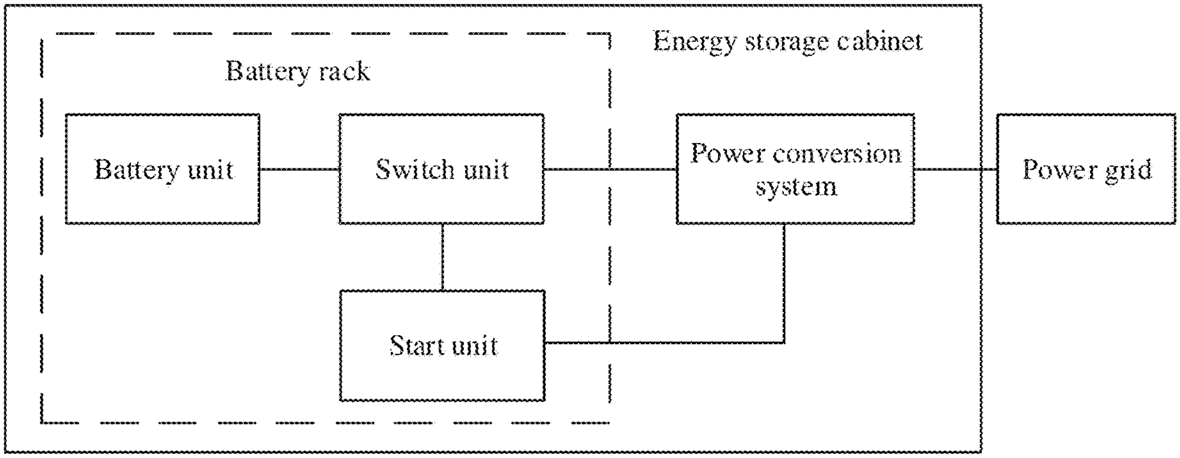
FIG. 4 is a diagram 1 of a structure of an energy storage cabinet according to an embodiment.

FIG. 4 is a diagram of a structure of an energy storage cabinet according to an embodiment. The energy storage cabinet includes a plurality of battery racks and a power conversion system. The battery rack includes a battery unit, a switch unit, and a start unit.

For example, the battery unit includes a plurality of energy storage batteries connected in series, a first end of the switch unit is connected to the battery unit, and a second end of the switch unit is connected to a second end of the power conversion system. When the switch unit is turned on, the battery unit is connected to the second end of the power conversion system. If the switch unit is turned off, the battery unit is disconnected from the second end of the power conversion system. A first end of the power conversion system may be connected to an electric energy output port of the energy storage cabinet. Therefore, the energy storage cabinet may be connected to a bus in an energy storage system to which the energy storage cabinet belongs through the first end of the power conversion system. The power conversion system is configured to: when a voltage at the first end of the power conversion system is greater than a first preset voltage, convert the voltage at the first end of the power conversion system into a target voltage, and supply power to the start unit by using the target voltage through the second end of the power conversion system. The start unit is connected to the second end of the power conversion system and the switch unit, and is configured to: when the power supplied by the power conversion system is received, control the switch unit to be turned on, so that the battery unit is connected to the power conversion system. The target voltage may be a rated voltage of the battery unit, or may be a power supply voltage of the start unit.

In an actual application scenario, the energy storage cabinet may be fastened on the energy storage system. Alternatively, the energy storage cabinet may be in a flexible and detachable form. For example, a fixed interface is disposed on the energy storage system, and the energy storage cabinet may be connected to another energy storage cabinet in the energy storage system through the fixed interface. In this case, the energy storage cabinet may be considered as an apparatus independent of the energy storage system.

For example, electric energy output ports of a plurality of energy storage cabinets in the energy storage system are connected together, and the first end of the power conversion system in the energy storage cabinet is connected to the electric energy output port of the energy storage cabinet. Therefore, when any energy storage cabinet in the energy storage system is normally started, electric energy exists on the bus, and the electric energy exists on a first end of a power conversion system in each energy storage cabinet. The power conversion system may not only process a direct current output by the battery unit and output the direct current to another energy storage cabinet and a power-consuming device through the first end of the power conversion system, but also process electric energy at the first end of the power conversion system and output the electric energy to the start unit through the second end of the power conversion system. Therefore, a power conversion system in a to-be-started energy storage cabinet may process electric energy output by another energy storage cabinet, and output the electric energy to a start unit through a second end of the power conversion system. The start unit may operate by using the electric energy output by the power conversion system and control a switch unit to be turned on. In this case, a battery unit is connected to the power conversion system, and may output the stored electric energy to the power-consuming device through the power conversion system, to start the energy storage cabinet. The first preset voltage may be a minimum voltage value of the first end when the power conversion system normally operates.

In actual application, the plurality of energy storage cabinets in the energy storage system may be connected to a direct current bus or an alternating current bus through first ends of power conversion systems. After one or more energy storage cabinets in the energy storage system are started, a voltage is generated on the direct current bus or the alternating current bus. When it is detected that the voltage on the direct current bus or the alternating current bus is greater than the first preset voltage, it is determined that an energy storage cabinet in the energy storage system is successfully started, and an energy storage cabinet that is not started may obtain electric energy from the alternating current bus or the direct current bus through a first end of a power conversion system, process the obtained electric energy, and then supply the electric energy to a start unit through a second end of the power conversion system. After receiving the electric energy, the start unit may control a switch unit to be turned on, to start the energy storage cabinet.

It can be understood from the foregoing descriptions that the power conversion system is a bidirectional conversion device. When the electric energy is transmitted from the first end of the power conversion system to the second end of the power conversion system, the first end of the power conversion system is used as an input end of the power conversion system to receive the electric energy, and the second end of the power conversion system is used as an output end of the power conversion system to output the electric energy. When the electric energy is transmitted from the second end of the power conversion system to the first end of the power conversion system, the second end of the power conversion system is used as an input end of the power conversion system to receive the electric energy, and the first end of the power conversion system is used as an output end of the power conversion system to output the electric energy.

The following describes a starting manner of the energy storage cabinet with reference to specific structures of the battery rack and the power conversion system in the energy storage cabinet.

A plurality of energy storage batteries may be disposed in the battery unit in the battery rack; and each energy storage battery may be a storage battery, or may be a storage battery cluster including a plurality of storage batteries. The energy storage battery may be a secondary battery or an energy storage capacitor. The secondary battery includes, but is not limited to, a lithium-ion battery, a sodium-ion battery, a potassium-ion battery, a magnesium-ion battery, a calcium-ion battery, an air battery, a lead-acid battery, a nickel-cadmium battery, and the like. A specific type of the secondary battery is not limited, provided that the battery can implement charging and discharging.

In an example, the plurality of energy storage batteries may be connected in series, a positive electrode of a first energy storage battery in the plurality of energy storage batteries is a positive electrode of the battery unit, and a negative electrode of a last energy storage battery in the plurality of energy storage batteries is a negative electrode of the battery unit.

In another example, the plurality of energy storage batteries may be connected in parallel, positive electrodes of the plurality of energy storage batteries are connected and used as a positive electrode of the battery unit, and negative electrodes of the plurality of energy storage batteries are connected and used as a negative electrode of the battery unit.

The start unit in the battery rack is connected to the switch unit, and the start unit may control the switch unit to be turned on or turned off. When the switch unit is turned on, the battery unit is connected to the second end of the power conversion system, and the power conversion system may process the electric energy stored in the battery unit and output the electric energy to the power-consuming device, to start the energy storage cabinet. When the switch unit is turned off, the battery unit is disconnected from the second end of the power conversion system.

In actual application, when the energy storage cabinet is installed for the first time or the power grid is powered off, the start unit may obtain electric energy output by another energy storage cabinet through the power conversion system, and operate by using the electric energy, to control the switch unit to be turned on, so as to start the energy storage cabinet.

The second end of the power conversion system is connected to the battery unit through the switch unit, and the first end of the power conversion system is connected to the bus in the energy storage system and the power-consuming device. The power conversion system may have one or more of a voltage regulation function, an inversion function, and a rectification function.

In a possible implementation, when a voltage amplitude of the second end of the power conversion system can meet a voltage requirement of a first end connection device, only a DC/AC converter may be disposed in the power conversion system, and the DC/AC converter is disposed between the first end and the second end of the power conversion system. The DC/AC converter may invert the electric energy output by the battery unit, and then output the electric energy to the power-consuming device or the bus through the first end of the power conversion system; or rectify the voltage received by the first end of the power conversion system, and then output the voltage to the start unit through the second end of the power conversion system.

In another possible implementation, when a voltage amplitude of the second end of the power conversion system cannot meet a voltage requirement of a first end connection device, a DC/DC converter may be disposed in the power conversion system, and the DC/DC converter is connected between the first end and the second end of the power conversion system. The DC/DC converter may perform voltage regulation on the electric energy output by the battery unit, and then output the electric energy to the power-consuming device or the bus through the first end of the power conversion system; or perform voltage regulation on the voltage received by the first end of the power conversion system, and then output the voltage to the start unit through the second end of the power conversion system.

In an example, because the energy storage system can be configured to supply power to the power grid or an alternating current load, a DC/AC converter connected between the DC/DC converter and the first end of the power conversion system may be further disposed in the power conversion system. The DC/AC converter may convert the direct current output by the DC/DC converter into an alternating current, to supply power to the power grid or the alternating current load.

In another example, to reduce a quantity and costs of devices in the energy storage system, the first end of the power conversion system is connected to the DC/AC converter. In other words, DC/DC converters in all the energy storage cabinets share one DC/AC converter.

The following describes in detail, with reference to embodiments, a process in which the start unit obtains electric energy from another started energy storage cabinet through the power conversion system and uses the obtained electric energy to control starting of the energy storage cabinet.

Figure 5:
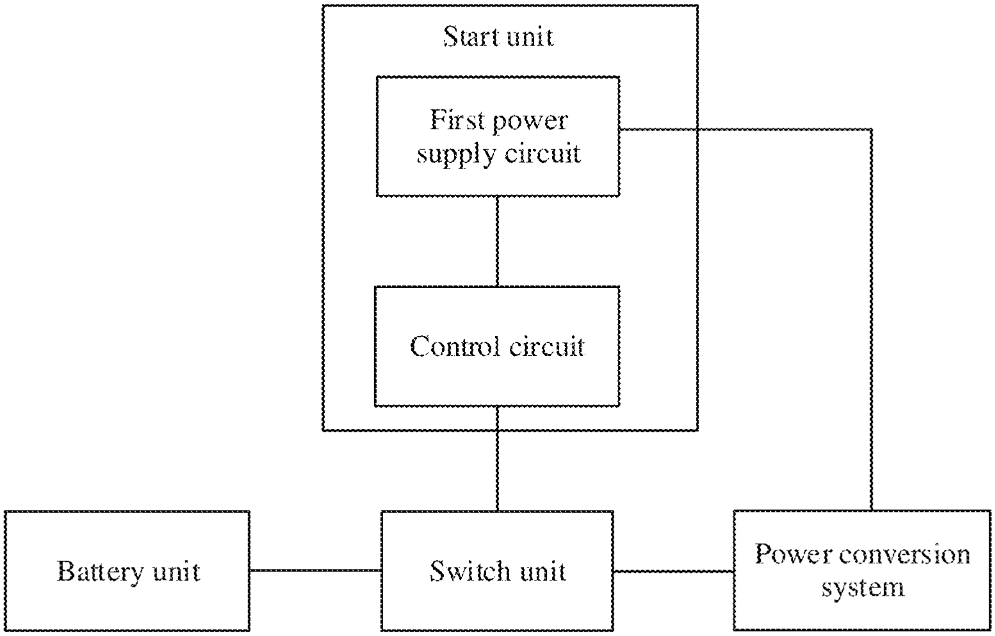
FIG. 5 is a diagram 1 of a structure of a start unit according to an embodiment.

For example, as shown in FIG. 5, the start unit includes a first power supply circuit and a control circuit. The first power supply circuit is connected to the second end of the power conversion system and the control circuit, and is configured to: when the power supplied by the power conversion system is received, supply the power to the control circuit. The control circuit is connected to the switch unit, and is configured to: when the power supplied by the first power supply circuit is received, control the switch unit to be turned on.

Figure 6:
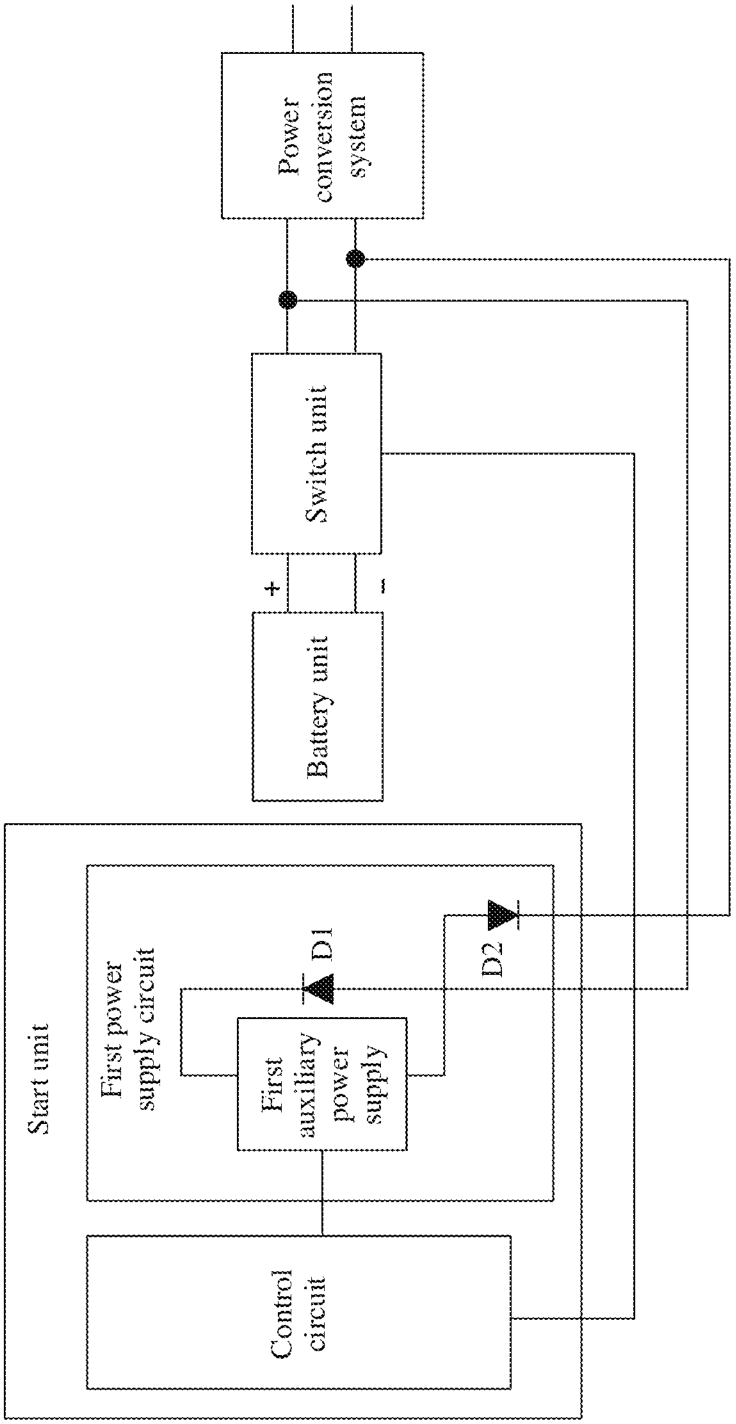
FIG. 6 is a diagram 1 of a structure of a first power supply circuit according to an embodiment.

FIG. 6 is a diagram of a structure of the first power supply circuit. The first power supply circuit includes a first auxiliary power supply, a first input end of the first auxiliary power supply is connected to a positive electrode of the second end of the power conversion system, a second input end of the first auxiliary power supply is connected to a negative electrode of the second end of the power conversion system, and an output end of the first auxiliary power supply is connected to the control circuit. The positive electrode of the second end of the power conversion system may be an interface that outputs a high level at the second end of the power conversion system, and the negative electrode of the second end of the power conversion system may be an interface that outputs a low level at the second end of the power conversion system.

When the first power supply circuit shown in FIG. 6 is used to control starting of the energy storage cabinet, if another energy storage cabinet in the energy storage system is started, the first end of the power conversion system may receive electric energy output by the another started energy storage cabinet, convert the received electric energy into the target voltage, and then supply power to the first auxiliary power supply through the second end of the power conversion system. The first auxiliary power supply receives, through the first input end and the second input end, the electric energy output by the power conversion system, and supplies power to the control circuit. After receiving the power supplied by the first auxiliary power supply, the control circuit sends a drive signal to a switch in the switch unit, to control the switch in the switch unit to be in a turned-on state, so that the battery unit is connected to the power conversion system, and the battery unit may output the stored electric energy to the power-consuming device or the bus through the power conversion system, to start the energy storage cabinet.

In a possible implementation, as shown in FIG. 6, to prevent device damage caused by a reverse current flow in a process in which the power conversion system supplies the power to the first auxiliary power supply, the first power supply circuit may further include a first diode D1 connected between the positive electrode of the second end of the power conversion system and the first input end of the first auxiliary power supply, and a second diode D2 connected between the negative electrode of the second end of the power conversion system and the second input end of the first auxiliary power supply.

Figure 7:
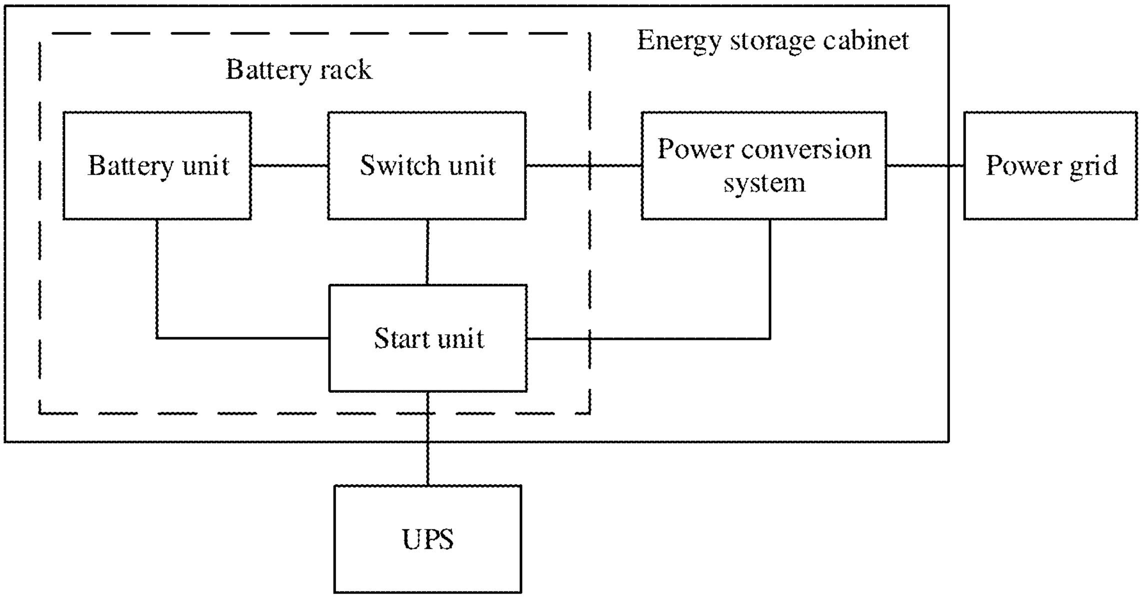
FIG. 7 is a diagram 2 of a structure of an energy storage cabinet according to an embodiment.

In the foregoing embodiment, the start unit uses the electric energy output by the another energy storage cabinet to control the switch unit to be turned on, to implement the process of starting the energy storage cabinet. In actual application, as shown in FIG. 7, the start unit may further be connected to an external alternating current power supply or the battery unit, receive power supplied by the battery unit or the external alternating current power supply, and control the switch unit to be turned on, to start the energy storage cabinet. The external alternating current power supply may be a UPS, and the UPS may be connected to the power grid, and is configured to store electric energy transmitted on the power grid when the power grid is normal, to provide electric energy required for black start of the energy storage cabinet.

Figure 8:
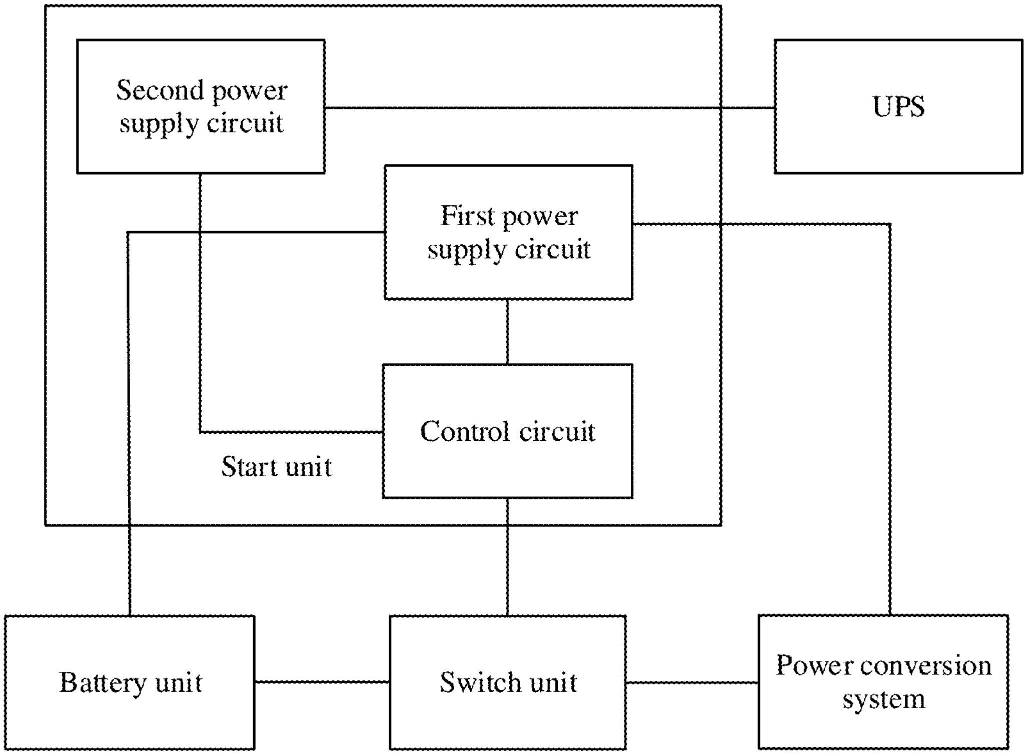
FIG. 8 is a diagram 2 of a structure of a start unit according to an embodiment.

In an example, as shown in FIG. 8, the first power supply circuit is further connected to the battery unit, and is configured to: when the power supplied by the battery unit is received, supply the power to the control circuit.

In another example, as shown in FIG. 8, the start unit further includes a second power supply circuit. The second power supply circuit is connected to the control circuit and the UPS, and is configured to: receive power supplied by the UPS, and supply the power to the control circuit. The control circuit is further configured to: when the power supplied by the second power supply circuit is received, control the switch unit to be turned on.

The following describes in detail, with reference to embodiments, a process in which the start unit controls the switch unit to be turned on by using the electric energy of the UPS or the battery unit.

Figure 9:
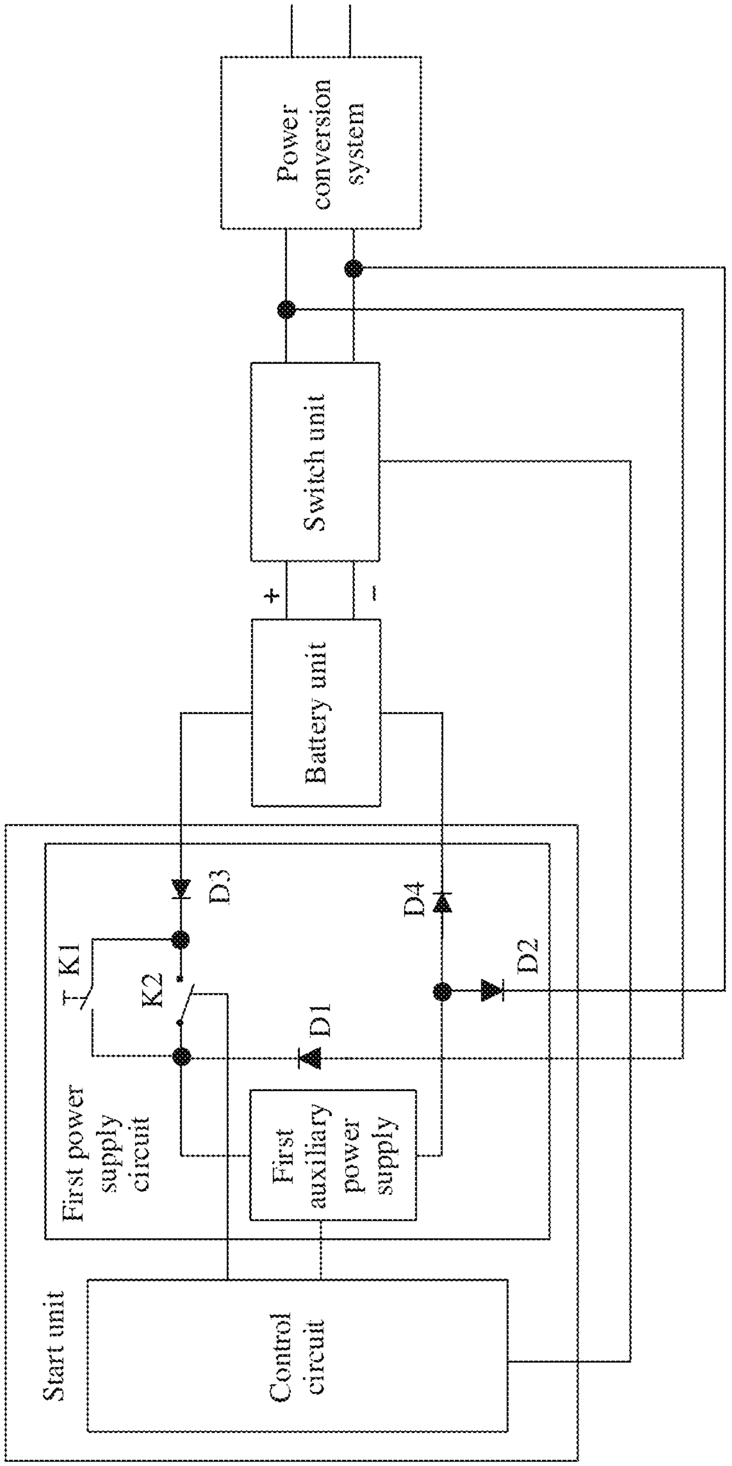
FIG. 9 is a diagram 2 of a structure of a first power supply circuit according to an embodiment.

As shown in FIG. 9, the first control circuit not only includes the first auxiliary power supply, but also includes a first switch K1 and a second switch K2. The first switch K1 and the second switch K2 are connected in parallel between the first input end of the first auxiliary power supply and a positive electrode of the battery unit, and the second input end of the first auxiliary power supply is connected to a negative electrode of the battery unit.

The first switch K1 may be a mechanical switch. For example, the first switch K1 may be a button switch shown in FIG. 9. When the first switch K1 is pressed, it may be determined that a control end of the first switch K1 receives a drive signal used to control the first switch K1 to be turned on. In this case, the first switch K1 is turned on to form an electric energy transmission path between the first auxiliary power supply and the battery unit. In other words, the first power supply circuit receives the power supplied by the battery unit. In actual application, the first switch K1 may alternatively be another type of switch, for example, an electrical control switch. A controller of the first switch K1 may be connected to an external drive apparatus or a processor. When a control end of the first switch K1 receives a drive signal used to control the first switch K1 to be turned on, the first switch K1 is turned on, and the first power supply circuit receives the power supplied by the battery unit. This embodiment is described by using an example in which the first switch K1 is a button switch.

When the first power supply circuit shown in FIG. 9 is used to control the energy storage cabinet to implement black start, if the first switch K1 is pressed, the first auxiliary power supply is connected to the battery unit, and the first auxiliary power supply may obtain power from the battery unit, and supply power to the control circuit by using electric energy obtained from the battery unit. After obtaining the electric energy, the control circuit sends a control signal to the switch unit, to control the switch unit to be turned on. In this case, the battery unit is connected to the second end of the power conversion system, and the electric energy stored in the battery unit may be output to the power-consuming device or the bus through the power conversion system, to implement black start of the energy storage cabinet.

In actual application, if the first switch K1 is a button switch, when the first switch K1 pops up, the first auxiliary power supply is disconnected from the battery unit. To ensure that the first auxiliary power supply can obtain power for a long time, after obtaining power from the first auxiliary power supply, the control circuit may send, to a control end of the second switch K2, a drive signal used to control the second switch K2 to be turned on, to control the second switch K2 to be in a turned-on state for a long time. Therefore, when the first switch K1 pops up and is in a turned-off state, the second switch K2 is still in the turned-on state, and maintains a connection between the battery unit and the first auxiliary power supply, so that the first power supply circuit receives the power supplied by the battery unit.

In a possible implementation, as shown in FIG. 9, to prevent a reverse current flow to the battery unit from damaging the battery unit, the first power supply circuit may further include: a third diode D3 connected between the second switch K2 and the positive electrode of the battery unit, and a fourth diode D4 connected between the second input end of the first auxiliary power supply and the negative electrode of the battery unit.

Figure 10:
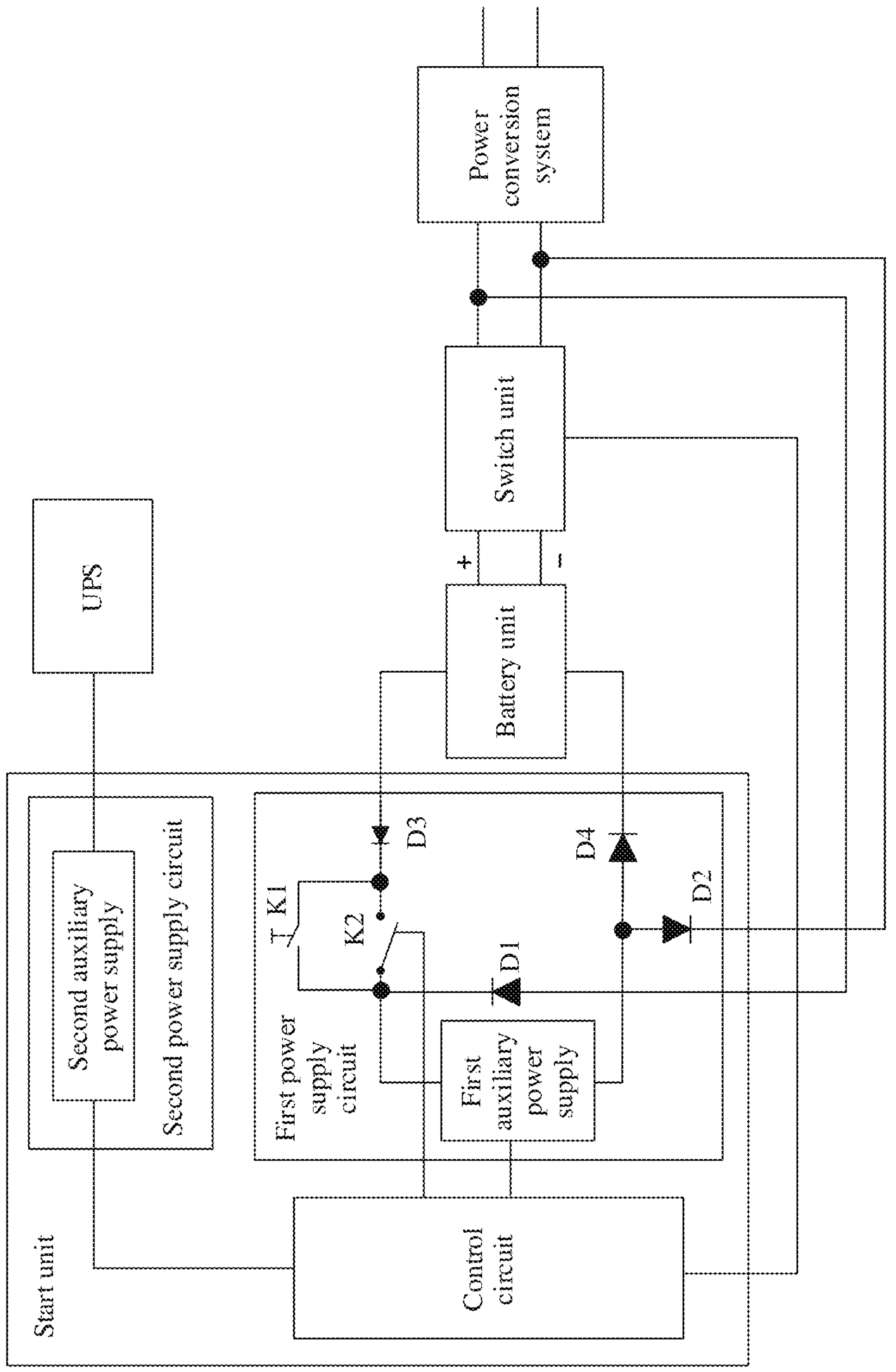
FIG. 10 is a diagram 1 of a structure of a second power supply circuit according to an embodiment.

FIG. 10 is a diagram of a structure of the second power supply circuit. The second power supply circuit includes a second auxiliary power supply, an input end of the second auxiliary power supply is configured to be connected to the UPS, and an output end of the second auxiliary power supply is connected to the control circuit. When an output voltage of the UPS is greater than a second preset voltage, the second auxiliary power supply may receive the power supplied by the UPS. In other words, the second power supply circuit receives the power supplied by the UPS. The second preset voltage may be a minimum voltage required for the second auxiliary power supply to operate.

In a possible implementation, a switch device is connected to the UPS side. When the switch device is turned on, an electric energy transmission path is formed between the UPS and the second auxiliary power supply. The UPS outputs the stored electric energy to the second auxiliary power supply, and a voltage received by the second auxiliary power supply is greater than the second preset voltage. Therefore, when it is detected that the output voltage on the UPS side is greater than the second preset voltage, the second power supply circuit may receive the power supplied by the UPS.

Figure 11:
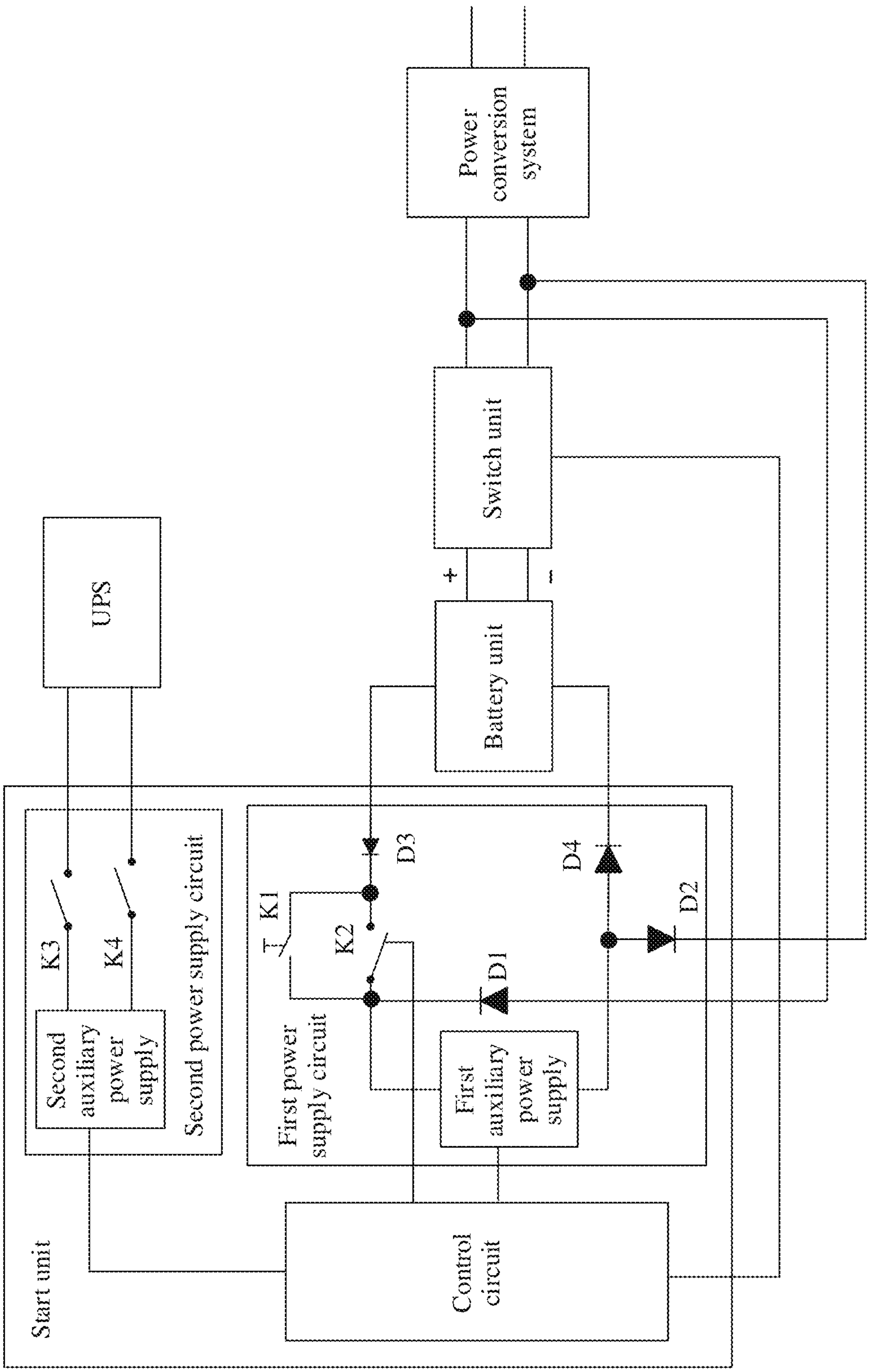
FIG. 11 is a diagram 2 of a structure of a second power supply circuit according to an embodiment.

In another possible implementation, as shown in FIG. 11, the second power supply circuit further includes a third switch K3 and a fourth switch K4 that are connected between the UPS and the input end of the second auxiliary power supply. The third switch K3 is connected between a positive electrode of the alternating current power supply and a first input end of the second auxiliary power supply, and the fourth switch K4 is connected between a negative electrode of the alternating current power supply and a second input end of the second auxiliary power supply. When a control end of the third switch K3 and a control end of the fourth switch K4 receive drive signals used to control the third switch K3 and the fourth switch K4 to be turned on, the third switch K3 and the fourth switch K4 are turned on to form an electric energy transmission path between the UPS and the second auxiliary power supply. Therefore, when the third switch K3 and the fourth switch K4 are turned on, the second power supply circuit may receive the power supplied by the UPS. The drive signals received by the third switch K3 and the fourth switch K4 may be provided by the external control apparatus or the UPS.

It should be noted that a quantity of switches disposed between the UPS and the second auxiliary power supply in the second power supply circuit is not limited in embodiments. Alternatively, only one switch may be disposed. For example, a branch in which the fourth switch is located in FIG. 11 is replaced with a conducting wire, and the conducting wire is connected to the third switch K3 to form an electric energy transmission path between the UPS and the second auxiliary power supply.

With reference to the foregoing descriptions, it can be understood that when the cable connection between the external alternating current power supply UPS and the energy storage cabinet is normal, the UPS may supply power to the second auxiliary power supply. After obtaining the power, the second auxiliary power supply supplies the power to the control circuit. The control circuit may control the switch unit to be turned on by sending a control signal to the switch in the switch unit, to implement black start of the energy storage cabinet. When the cable connection between the external alternating current power supply UPS and the energy storage cabinet is incorrect, the first switch K1 is pressed, so that the battery unit supplies power to the first auxiliary power supply. After obtaining the power, the first auxiliary power supply may supply the power to the control circuit. The control circuit may control the switch unit to be turned on by sending a control signal to the switch in the switch unit, to implement black start of the energy storage cabinet.

Figure 12:
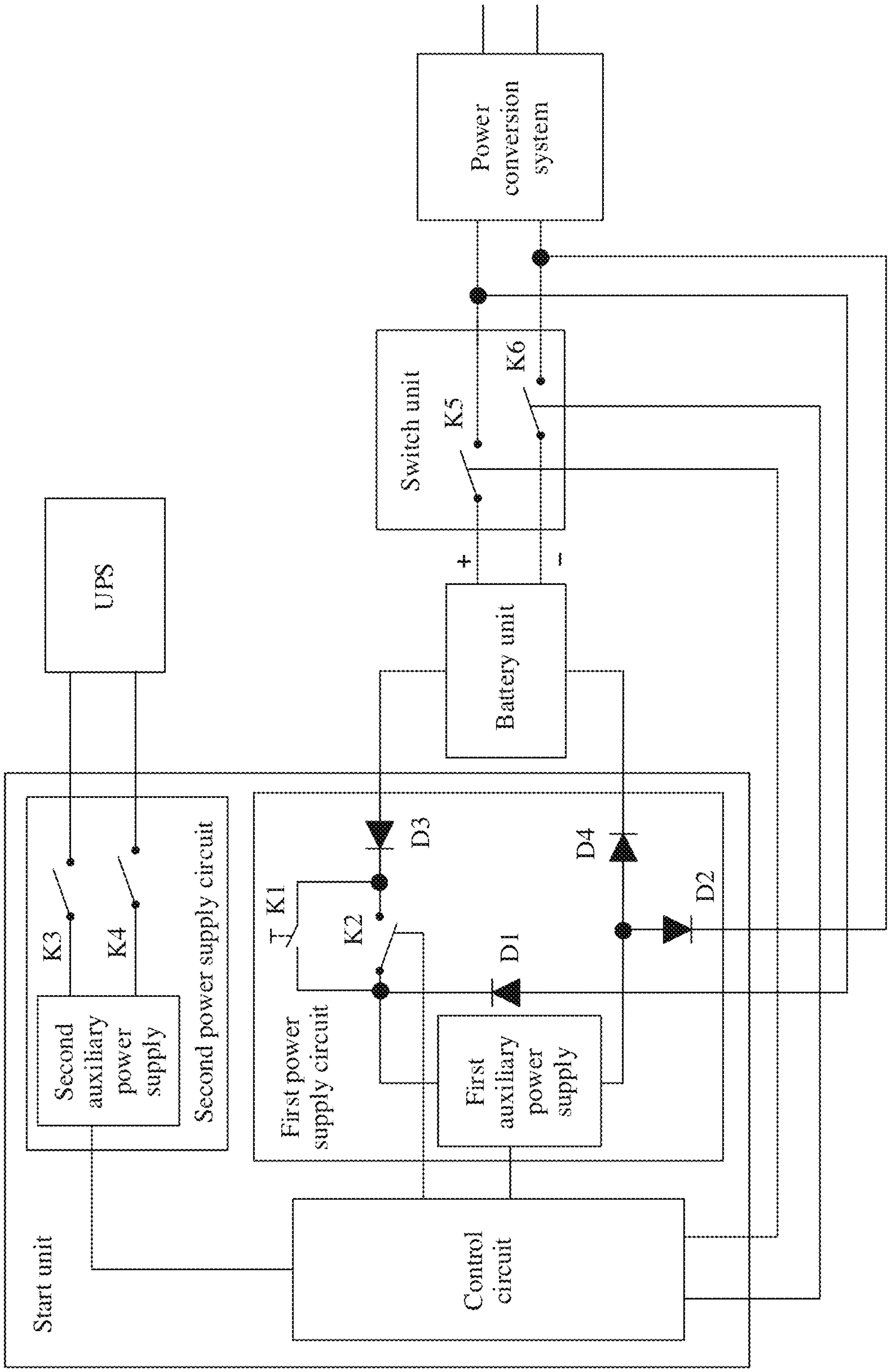
FIG. 12 is a diagram of a structure of a switch unit according to an embodiment of this application.

In a specific implementation, as shown in FIG. 12, the switch unit may include a fifth switch and a sixth switch. The fifth switch is connected between the positive electrode of the battery unit and the positive electrode of the second end of the power conversion system, and the sixth switch is connected between the negative electrode of the battery unit and the negative electrode of the second end of the power conversion system.

As shown in FIG. 12, after obtaining the power, the control circuit sends, to the fifth switch K5 and the sixth switch K6, drive signals used to control the fifth switch K5 and the sixth switch K6 to be turned on. The fifth switch K5 and the sixth switch K6 are turned on. In this case, the switch unit is turned on, the fifth switch K5 and the sixth switch K6 form an electric energy transmission path between the battery unit and the power conversion system, and the electric energy stored in the battery unit is output to the power-consuming device or the bus through the power conversion system, to implement black start of the energy storage cabinet.

It should be noted that a quantity of switches disposed in the switch unit is not limited in embodiments. Alternatively, only one switch may be disposed. For example, a branch in which the sixth switch is located in FIG. 12 is replaced with a conducting wire, and the conducting wire is connected to the fifth switch K5 to form an electric energy transmission path between the battery unit and the power conversion system.

FIG. 4 to FIG. 12 show three starting manners of the energy storage cabinet. After the energy storage cabinet is successfully started, running of the energy storage cabinet further needs to be protected. In other words, the start unit may further include an overvoltage protection circuit, a residual current detection circuit, an insulation impedance detection circuit, and an undervoltage protection circuit. All the foregoing several protection circuits may be connected to the control circuit. When detecting that a fault occurs inside the energy storage cabinet, the control circuit may disconnect the battery unit from the power conversion system through the switch unit, to protect safety of the entire energy storage system and avoid an expansion of a fault range.

When the battery unit in the energy storage cabinet is faulty, an energy storage battery in the battery unit may be replaced, causing a change in the quantity of energy storage batteries in the battery unit. The undervoltage protection circuit and the overvoltage protection circuit in the energy storage cabinet may be configured based on the quantity of energy storage batteries in the battery unit.

Figure 13:
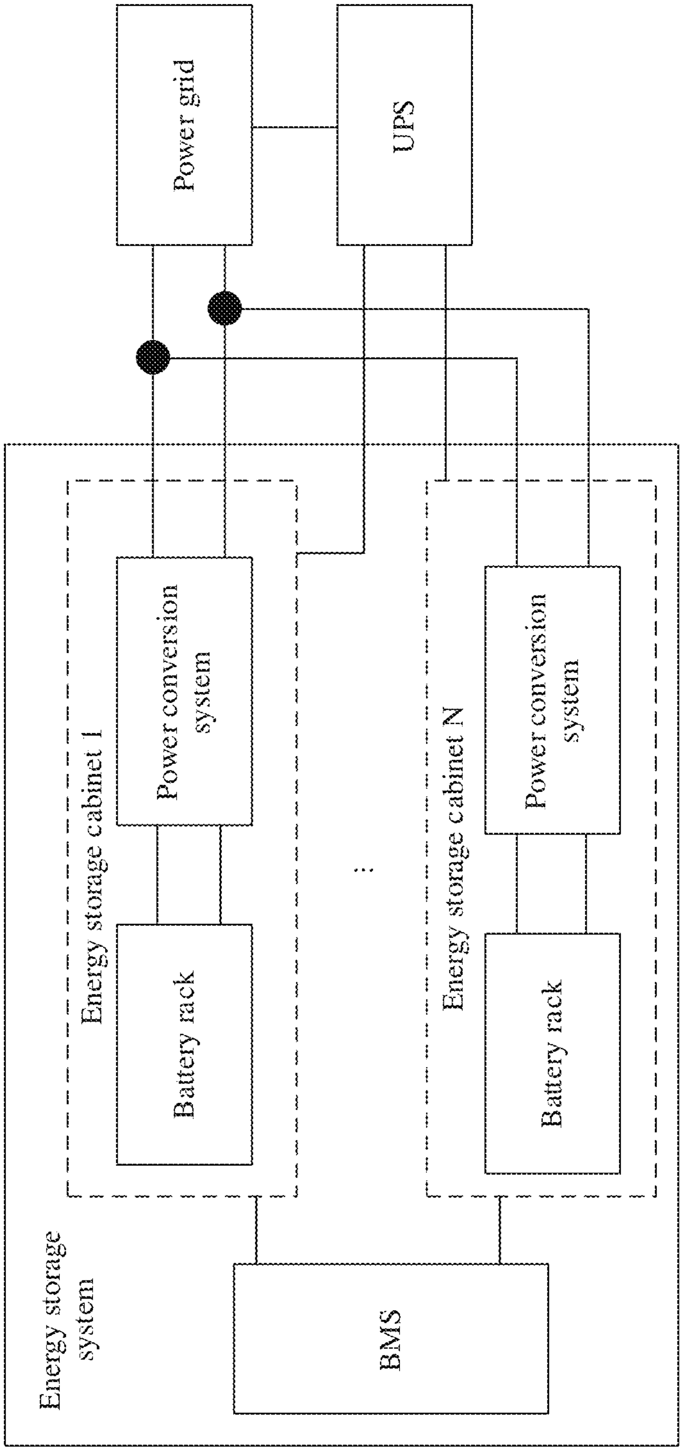
FIG. 13 is a diagram 2 of a structure of an energy storage system according to an embodiment.

Based on a same concept, an embodiment further provides an energy storage system. As shown in FIG. 13, the energy storage system may include a plurality of energy storage cabinets and a bus. A first end of a power conversion system in each energy storage cabinet is connected to the bus.

In an example, the energy storage system may further include a battery management system (BMS). The BMS is connected to all the energy storage cabinets, and is configured to monitor a running status of each energy storage cabinet in the energy storage system. The running status may be a start state and a remaining capacity. Monitoring of the running status may be implemented by detecting parameters such as a current, a voltage, and power of each energy storage cabinet.

For example, the plurality of energy storage cabinets are connected in parallel to a power-consuming device, and are configured to output stored electric energy to the power-consuming device. In addition, because the plurality of energy storage cabinets are connected in parallel, electric energy output by each energy storage cabinet may be transmitted to the bus. The power-consuming device may be a power grid or a load. The following uses an example in which the power-consuming device is the power grid for description.

In a possible implementation, the energy storage system may include N energy storage cabinets, where some energy storage cabinets are the foregoing energy storage cabinets, and the remaining energy storage cabinets are in an existing energy storage cabinet architecture. N is a positive integer greater than or equal to 2.

In another possible implementation, the energy storage system may include N energy storage cabinets, and the N energy storage cabinets are all the foregoing energy storage cabinets.

In an example, as shown in FIG. 13, an energy storage cabinet 1 to an energy storage cabinet N are all connected to a UPS, and a control circuit in a single energy storage cabinet controls the energy storage cabinet to be started, to complete starting of the entire energy storage system.

Figure 14:
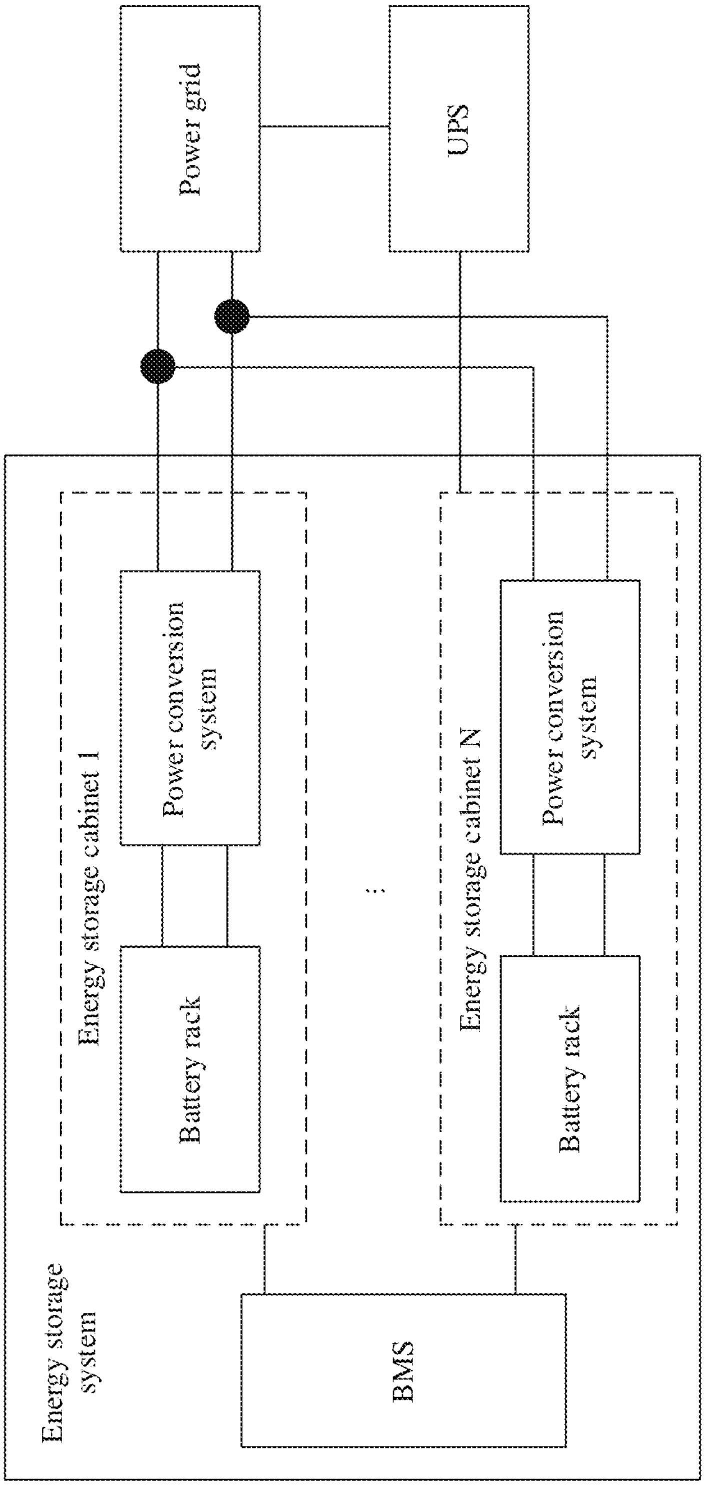
FIG. 14 is a diagram 3 of a structure of an energy storage system according to an embodiment.

In another example, a single energy storage cabinet may obtain electric energy from a started energy storage cabinet and implement starting. Therefore, to avoid a cable connection error, as shown in FIG. 14, a UPS may be connected to an energy storage cabinet in the energy storage system. For example, the UPS is connected to the energy storage cabinet N. When the energy storage cabinet N is normally started, the energy storage cabinet 1 to an energy storage cabinet N-1 may be started by using electric energy output by the energy storage cabinet N, to complete starting of the entire energy storage system.

Figure 15:
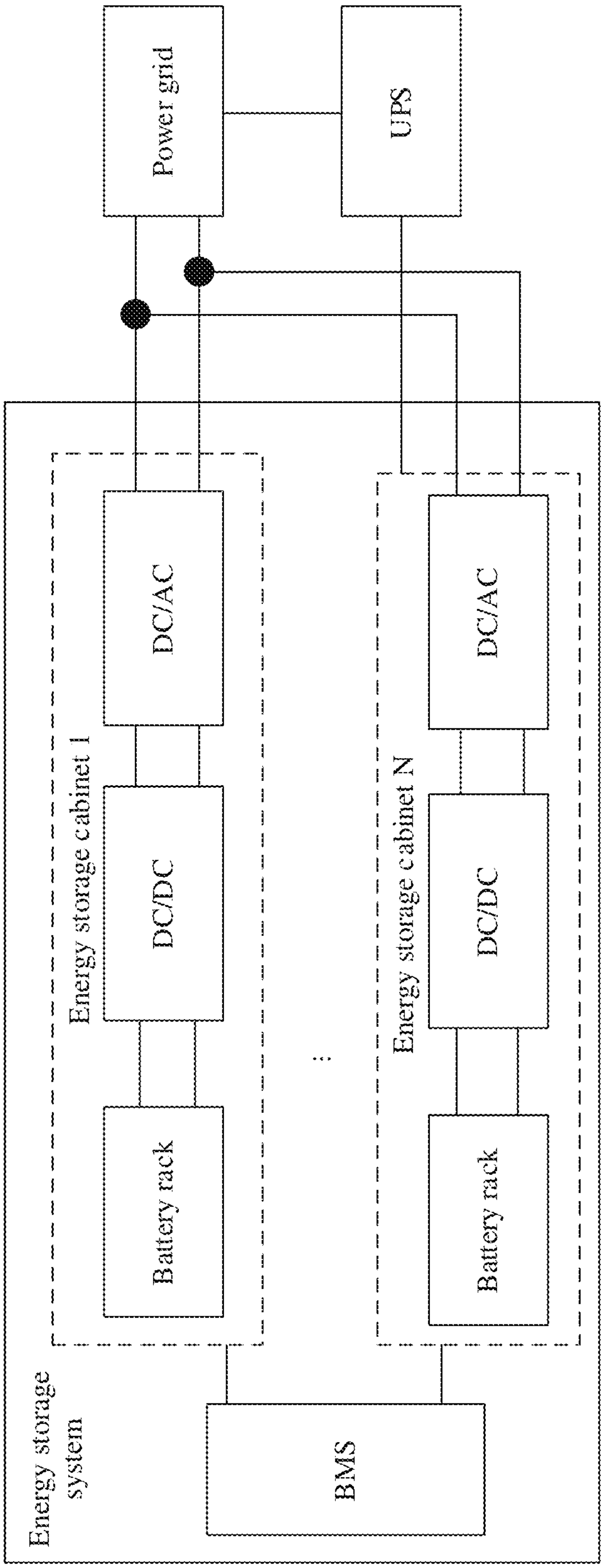
FIG. 15 is a diagram 4 of a structure of an energy storage system according to an embodiment.

In a possible implementation, as shown in FIG. 15, when a voltage amplitude output by a battery unit cannot meet a voltage amplitude requirement of the power-consuming device, the power conversion systems in the plurality of energy storage cabinets include a DC/DC converter and a DC/AC converter. The DC/DC converter performs voltage regulation on electric energy output by the battery unit and outputs the electric energy, and the DC/AC converter inverts the electric energy output by the DC/DC converter and outputs the electric energy to a back-end connection device.

Figure 16:
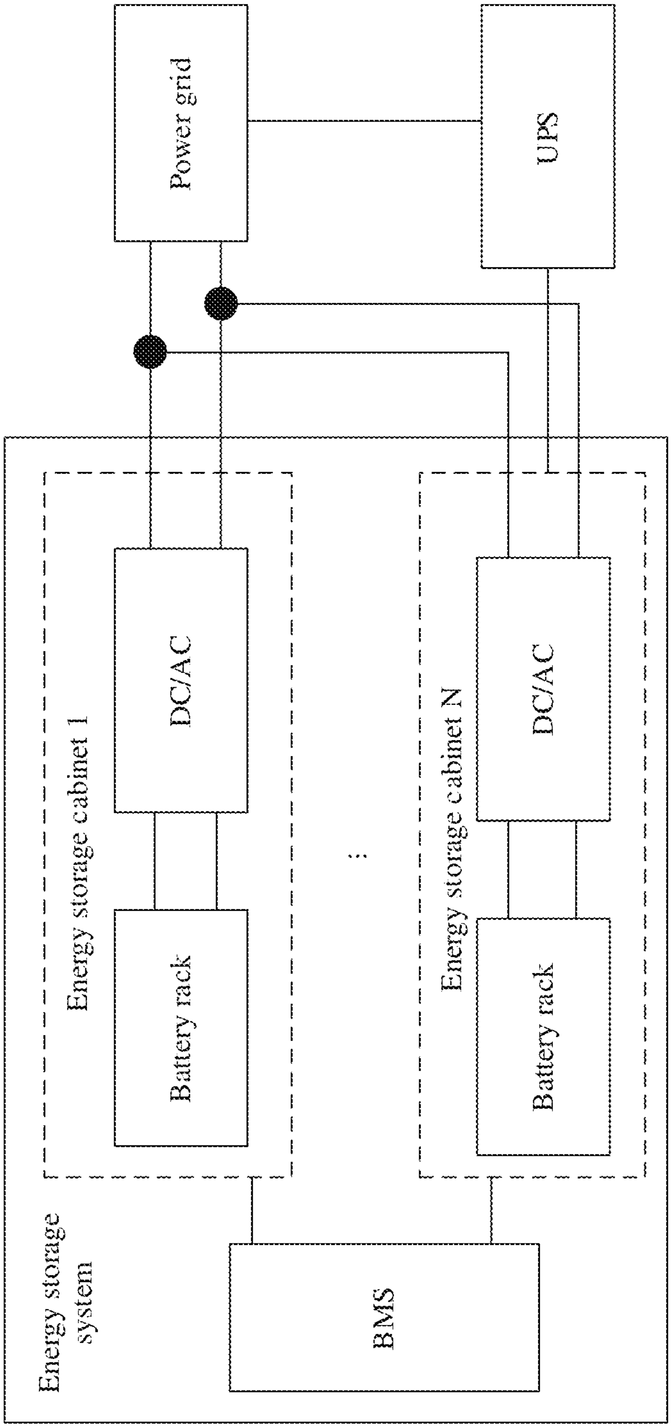
FIG. 16 is a diagram 5 of a structure of an energy storage system according to an embodiment.

In a possible implementation, when a voltage amplitude output by a battery unit can meet a voltage amplitude requirement of the power-consuming device, as shown in FIG. 16, the power conversion systems in the plurality of energy storage cabinets are DC/AC converters, and the DC/AC converters invert electric energy output by the battery unit and output the electric energy to a back-end connection device.

Figure 17:
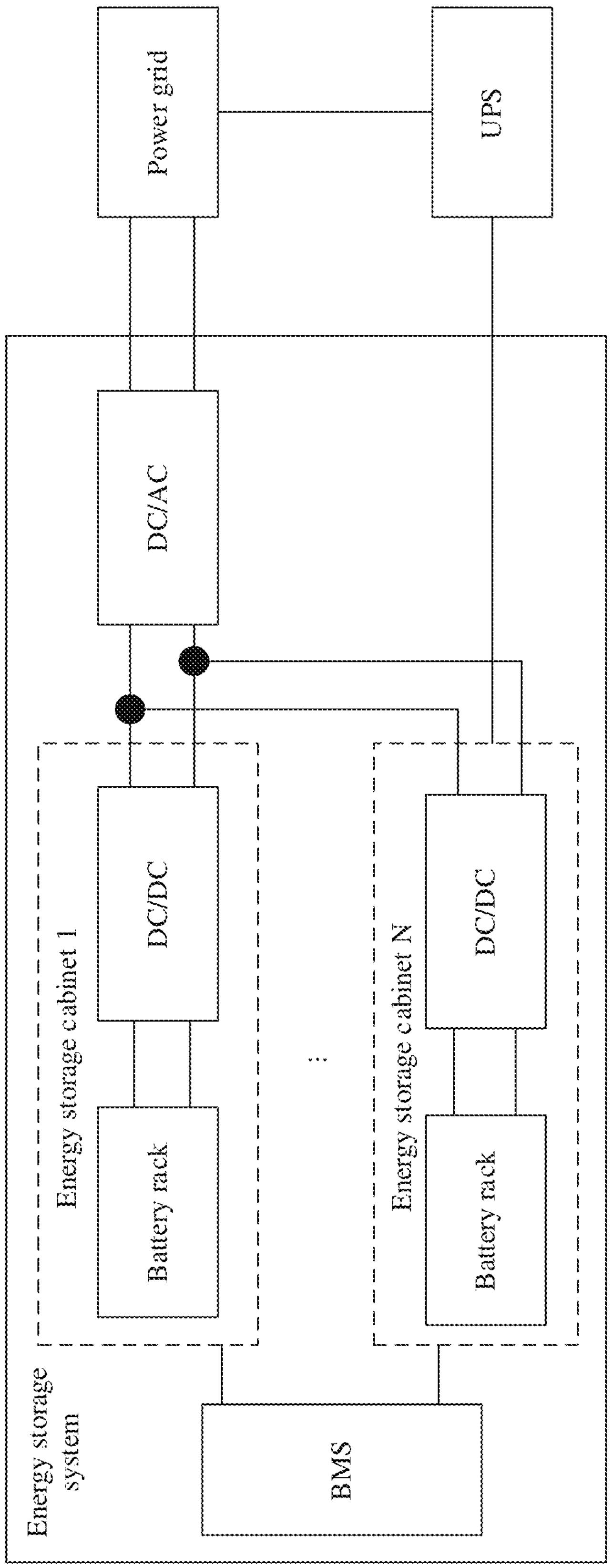
FIG. 17 is a diagram 6 of a structure of an energy storage system according to an embodiment.

In a possible implementation, as shown in FIG. 17, to reduce a quantity and costs of devices in the energy storage system, the power conversion systems in the plurality of energy storage cabinets are DC/DC converters, the energy storage system may further include one DC/AC converter, the DC/DC in each energy storage cabinet is connected to the DC/AC converter, and the DC/AC converters may invert voltages output by all the DC/DC converters to a power grid voltage.

It should be understood that, in FIG. 13 to FIG. 17, a connection line between the energy storage system and the power grid is a simplified example. In a specific implementation, when the energy storage system can output a single-phase alternating current or a three-phase alternating current, electric energy transmission lines of a corresponding quantity are configured based on a type of the alternating current output by the energy storage system, to implement electric energy transmission. Such a conventional technology in the art is not limited.

Based on a same concept, an embodiment provides a photovoltaic system. As shown in FIG. 1 or FIG. 2, the photovoltaic system includes a plurality of photovoltaic modules, a direct current to direct current DC/DC converter, a direct current to alternating current DC/AC converter, and the foregoing energy storage system.

The plurality of photovoltaic modules are connected to the DC/DC converter, and the plurality of photovoltaic modules are configured to convert light energy into a first direct current, and output the first direct current to the DC/DC converter. The DC/DC converter is connected to the DC/AC converter, and the DC/DC converter is configured to convert the first direct current into a second direct current, and output the second direct current to the DC/AC converter. The DC/AC converter is connected to the energy storage system, and is configured to convert the second direct current into an alternating current, and output the alternating current to a power-consuming device or the energy storage system. The energy storage system is configured to convert the alternating current into a third direct current and store the third direct current, or convert stored electric energy into the alternating current and output the alternating current to the power-consuming device.

Optionally, as shown in FIG. 2, the photovoltaic system may further include a controller, and the controller may control running of the DC/DC converter and the DC/AC converter.

Based on a same concept, an embodiment provides a power supply system. The power supply system includes an alternating current power supply, at least one power-consuming device, and the foregoing energy storage system. The alternating current power supply may be an uninterruptible power supply UPS.

The UPS is connected to a part of or all energy storage cabinets in the energy storage system, and is configured to obtain electric energy from a power grid and supply power to the part of or all energy storage cabinets in the energy storage system. The energy storage system is connected to the at least one power-consuming device, and is configured to obtain electric energy from the power grid and store the electric energy, or use stored electric energy to supply power to the at least one power-consuming device.

It is clear that a person skilled in the art can make various modifications and variations to embodiments without departing from their scope. The embodiments are intended to cover these modifications and variations, as well as their equivalent technologies.

What is claimed is:

1. An energy storage cabinet, comprising
a battery rack comprising:
a battery unit that comprises a plurality of energy storage batteries connected in series,
a switch unit, and
a start unit; and
a power conversion system, wherein the switch unit is connected between the battery unit and the power conversion system, a first end of the power conversion system is configured to be connected to a bus in an energy storage system to which the energy storage cabinet belongs; when a voltage at the first end of the power conversion system is greater than a first preset voltage, the power conversion system is configured to:
convert the voltage at the first end of the power conversion system into a target voltage, and
supply power to the start unit through a second end of the power conversion system; and the start unit is configured to:
when the power supplied by the power conversion system is received, control the switch unit to be turned on, so that the battery unit is connected to the power conversion system.

2. The energy storage cabinet according to claim 1, wherein the start unit is further configured to:
receive power supplied by the battery unit, and
control the switch unit to be turned on.

3. The energy storage cabinet according to claim 1, wherein the start unit comprises a control circuit and a first power supply circuit connected between the control circuit and the second end of the power conversion system that is configured to:
when the power supplied by the power conversion system is received, supply the power to the control circuit; and
the control circuit is connected to the switch unit, and is further configured to:
when the power supplied by the first power supply circuit is received, control the switch unit to be turned on.

4. The energy storage cabinet according to claim 3, wherein the first power supply circuit further comprises:

a first auxiliary power supply, a first input end of the first auxiliary power supply is connected to a positive electrode of the second end of the power conversion system, a second input end of the first auxiliary power supply is connected to a negative electrode of the second end of the power conversion system, and an output end of the first auxiliary power supply is connected to the control circuit.

5. The energy storage cabinet according to claim 4, wherein the first power supply circuit further comprises:

a first diode connected between the positive electrode of the second end of the power conversion system and the first input end of the first auxiliary power supply; and a second diode connected between the negative electrode of the second end of the power conversion system and the second input end of the first auxiliary power supply.

6. The energy storage cabinet according to claim 3, wherein the first power supply circuit further comprises:

a first switch; and a second switch, the first switch and the second switch are connected in parallel between the first input end of the first auxiliary power supply and a positive electrode of the battery unit;

the second input end of the first auxiliary power supply is further connected to a negative electrode of the battery unit, and when the first switch is turned on, the first power supply circuit receives the power supplied by the battery unit; and the second switch is configured to be turned on when the first switch is turned off, so that the first power supply circuit receives the power supplied by the battery unit.

7. The energy storage cabinet according to claim 6, wherein the first power supply circuit further comprises:

a third diode connected between the second switch and the positive electrode of the battery unit; and a fourth diode connected between the second input end of the first auxiliary power supply and the negative electrode of the battery unit.

8. The energy storage cabinet according to claim 3, wherein the start unit further comprises:

a second power supply circuit connected to the control circuit and the alternating current power supply that is configured to:

receive the power supplied by the alternating current power supply and supply the power to the control circuit; and the control circuit is further configured to:

when the power supplied by the second power supply circuit is received, control the switch unit to be turned on.

9. The energy storage cabinet according to claim 8, wherein the second power supply circuit further comprises:

a second auxiliary power supply, an input end of the second auxiliary power supply is configured to be connected to the alternating current power supply, and an output end of the second auxiliary power supply is connected to the control circuit.

10. The energy storage cabinet according to claim 2, wherein the start unit is further configured to:

when an output voltage of the alternating current power supply is greater than a second preset voltage, receive the power supplied by the alternating current power supply.

11. The energy storage cabinet according to claim 9, wherein the second power supply circuit further comprises:

a third switch connected between the alternating current power supply and a first input end of the second auxiliary power supply; and a fourth switch connected between the alternating current power supply and a second input end of the second auxiliary power supply; and when the third switch and the fourth switch are turned on, the second power supply circuit receives the power supplied by the alternating current power supply.

12. The energy storage cabinet according to claim 11, wherein the switch unit further comprises:

a fifth switch connected between the positive electrode of the battery unit and the positive electrode of the second end of the power conversion system; and a sixth switch connected between the negative electrode of the battery unit and the negative electrode of the second end of the power conversion system.

13. The energy storage cabinet according to claim 1, wherein the battery rack further comprises:

an undervoltage protection circuit, and an action voltage of the undervoltage protection circuit is set based on a quantity of energy storage batteries in the battery unit.

14. An energy storage system comprising:

a plurality of energy storage cabinets; and a bus; wherein each energy storage cabinet comprises a battery rack and a power conversion system, and a first end of the power conversion system in each energy storage cabinet is connected to the bus the battery rack comprises a battery unit, a switch unit, and a start unit;

the battery unit comprises a plurality of energy storage batteries connected in series;

the switch unit is connected between the battery unit and the power conversion system;

one of the plurality of energy storage cabinets is configured to connect to an uninterruptible power supply (UPS), and the UPS is configured to provide electric energy required for black start of the energy storage cabinet;

after the one energy storage cabinet is started, an energy storage cabinet that is not started in the plurality of energy storage cabinets obtains electric energy from the bus through the first end of the power conversion system;

the power conversion system in the unstarted energy storage cabinet is configured to:

when a voltage at the first end of the power conversion system in the unstarted energy storage cabinet is greater than a first preset voltage, convert the voltage at the first end of the power conversion system into a target voltage, and supply power to the start unit through the second end of the power conversion system;

the start unit is configured to:

when receiving power supplied by the power conversion system, control the switch unit to be turned on, so that the battery unit is connected to the power conversion system, and the unstarted energy storage cabinet is started.

15. The energy storage system according to claim 14, wherein power conversion systems in the plurality of energy storage cabinets are DC/DC converters, the energy storage system further comprises a DC/AC converter, and the DC/DC converters are all connected to the DC/AC converter.

16. The energy storage cabinet according to claim 1, wherein the start unit is further configured to:

receive power supplied by an alternating current power supply, and control the switch unit to be turned on.

17. The energy storage cabinet according to claim 6, wherein the first switch is a mechanical switch.

18. The energy storage cabinet according to claim 17, wherein the mechanical switch is a button switch.

19. The energy storage system according to claim 15, further comprising:

a controller configured to control both the DC/DC converters and the DC/AC converter.

20. The energy storage cabinet according to claim 16, wherein the alternating current power supply is an uninterruptible power supply (UPS).

* * * * *